May 26, 1959      G. C. GRAHAM      2,888,054
CARVING BOARD AND MEAT LOCK
Filed July 13, 1955      2 Sheets-Sheet 1
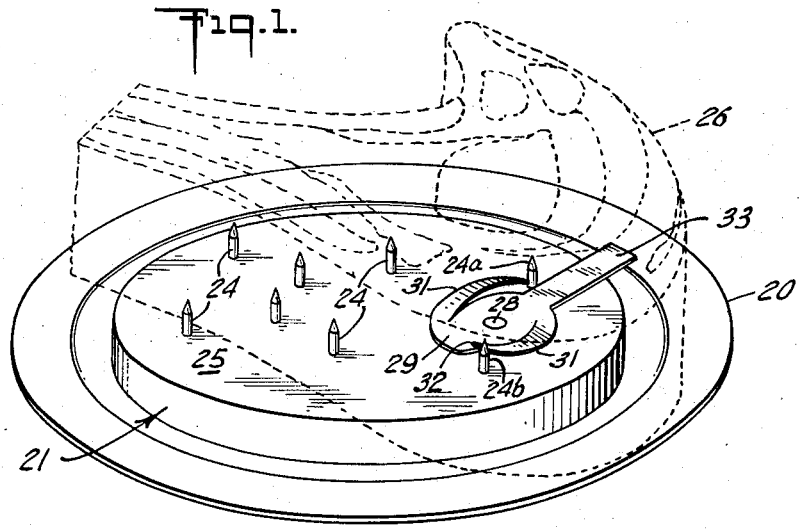
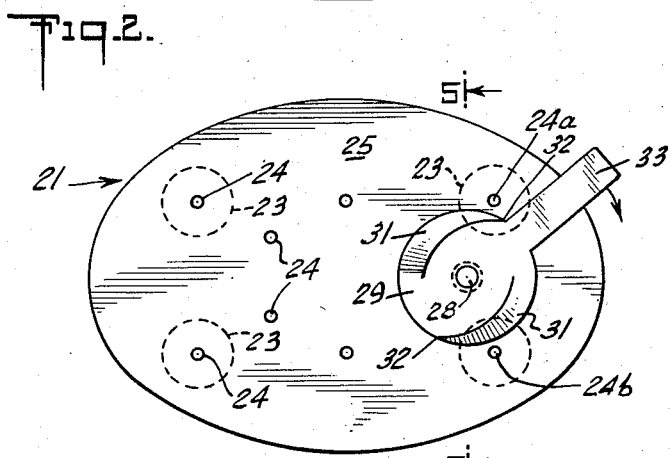
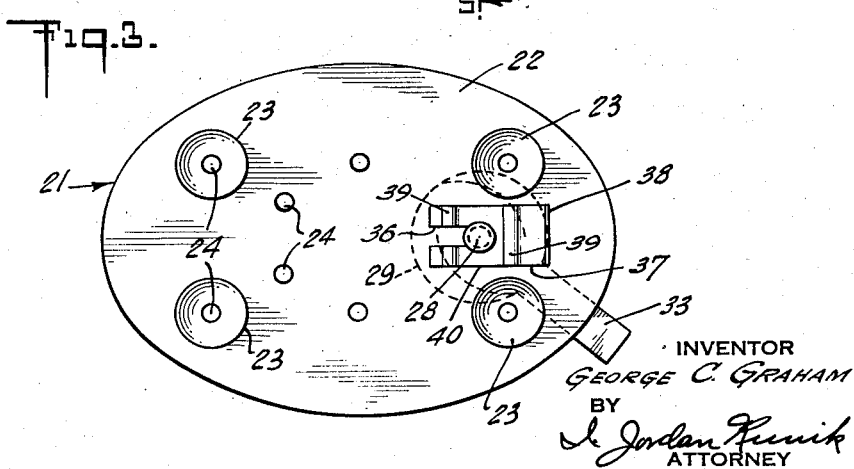
INVENTOR
GEORGE C. GRAHAM
BY
*L. Jordan Runik*
ATTORNEY May 26, 1959     G. C. GRAHAM     2,888,054
CARVING BOARD AND MEAT LOCK
Filed July 13, 1955     2 Sheets-Sheet 2
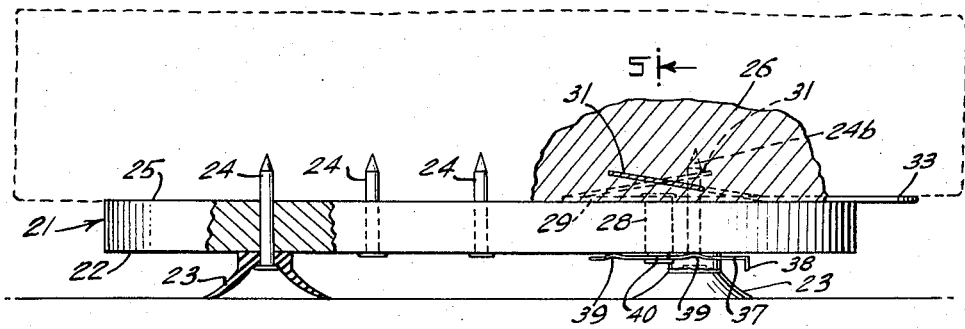
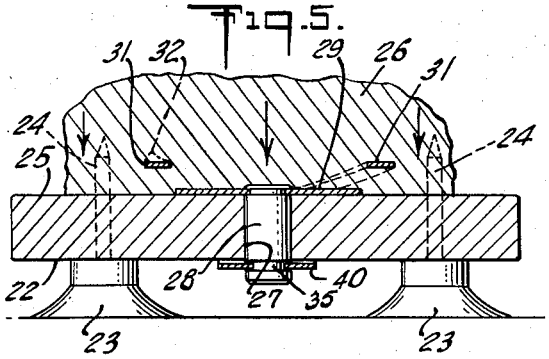 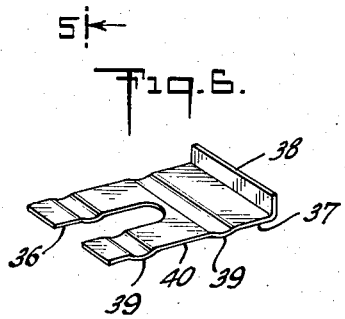
INVENTOR
GEORGE C. GRAHAM.
BY
ATTORNEY

United States Patent Office 2,888,054
Patented May 26, 1959

2,888,054

CARVING BOARD AND MEAT LOCK

George C. Graham, Ridgewood, N.J.

Application July 13, 1955, Serial No. 521,732

7 Claims. (Cl. 146—216)

This invention relates to new and useful improvements in devices for securing meat and fowl in position for carving purposes.

In carving cooked meat or fowl on a carving board, it is desirable to be able to cut slices of the meat without interference from various harnesses or other securing devices that are often utilized in other carving boards where a frame surrounds the object, thereby preventing a complete longitudinal cut from end to end along the whole side or top of the meat.

Therefore, I provide a device having a meat holding screw element which is adapted to grasp the meat from the bottom surface thereof and urge it tightly against the top surface of the carving board, whereby all the other surfaces of the meat are free for slicing as desired.

One embodiment of the present device comprises a board having a plurality of upwardly extending prongs, and a screw element positioned between a pair of said prongs which, when said screw is rotated, engages the meat and draws it securely to the board and onto the prongs, the latter serving also to prevent rotation and movement of the meat on the board. The pair of prongs adjacent the screw element also serve to limit the rotation of said element to insure proper wedging action on the meat as it is being secured to the board.

A salient feature of the invention is the provision of a screw element for grasping the meat, which element may be formed of a single piece of sheet metal, of stainless steel or the like, portions of which are cut into curved tines which extend from one surface thereof and whose points turn in the same substantially circular direction so that they perform a screw action when the element is rotated against the meat. The other flat side of the element may lie against a carving board surface along which it slides when rotated. In other embodiments the screw element may be mounted upon a suction cup or the like which serves to secure the screw and the meat skewered thereon in position upon a serving platter, carving board, table, or the like.

Still other objects and advantages of my invention will be apparent from the specification.

The features of novelty which I believe to be characteristic of my invention are set forth herein and will best be understood, both as to their fundamental principles and as to their particular embodiments, by reference to the specification and accompanying drawings, in which:

Figure 1 is a top perspective view of the screw and carving board of the present invention showing the meat mounted thereon in phantom outline, prior to securing said meat with the screw;

Fig. 2 is a top plan view of the carving board shown in Fig. 1;

Fig. 3 is a bottom view of the carving board shown in Figs. 1 and 2;

Fig. 4 is an enlarged elevation of the carving board shown in Fig. 1 with the screw shown engaging the meat and securing it to the board;

Fig. 5 is an enlarged section view taken on line 5—5 of Figs. 2 and 4; and

Fig. 6 is an enlarged perspective view of the spring clip that secures the shaft of the screw to the board.

Referring now to the drawings in detail, Fig. 1 shows a serving platter 20 upon which is mounted a carving board generally designated 21, of a suitable size and shape. On the lower surface 22 of board 21 are positioned a plurality of vacuum cups 23 made of resilient material such as rubber, neoprene, or the like. Vacuum cups 23 may be secured in position by means of some of the prongs 24 in the form of nails or the like that are pierced through the hubs of said cups, and extend through board 21. Prongs 24, some of which extend through board 21 without engaging any vacuum cups, may be made of stainless steel, aluminum, or the like, which will not be corroded by raw or cooked meat, or the like. Prongs 24 extend upwardly substantially perpendicularly above the top surface 25 of board 21 to an extent sufficient to engage meat 26 to prevent its lateral movement on the board.

Near one end of board 21, is a vertical aperture 27 through which a shaft 28 rotatably extends (Fig. 5). Attached to the upper end of shaft 28 is a substantially flat member 29 adapted to rotate about the axial center of the shaft. Outer portions of member 29 are cut and bent in the form of tines 31 of substantially equal length which curve in the same circular direction upwardly and obliquely from the surface of member 29 and terminate in points 32 which may be sharp or blunt as required. In some embodiments only one tine 31 will satisfactorily perform the function of securing the meat to the carving board, while in other embodiments more than two tines may be found useful.

Member 29 has an elongated portion in the form of a handle 33 which extends over the edge of board 21, and is adapted to be grasped and moved to cause tines 31 to engage meat 26. The angle and curvature of tines 31 are arrayed in the same general direction so that when handle 33 is grasped and moved to rotate member 29, tines 31 act as a screw, and pierce the bottom surface of meat 26, enter into the mass thereof and draw it toward the top surface 25 of board 21. By providing a suitable stiffness in tines 31, a strong wedging action will be produced upon the engaged portion of the meat to hold it securely to the board. This wedging action upon the meat will also cause it to be forced downward upon prongs 24 which assist in securing the meat to board 21.

Two of the perpendicular prongs, namely 24a and 24b may be positioned at suitable places near member 29 where they serve as stops for handle 33 whose angular movement is limited, if desired, to approximately the angular length of tines 31 to provide the proper wedging action of the latter upon the meat. Also the positions of either or both prongs 24a and 24b may be predetermined in relationship to the points of the nearest tines 31, respectively, or vice versa, so as to control the piercing of the meat and wedging it onto the board.

When tines 31 have entered into meat 26, as shown in Fig. 4, the meat is firmly fixed in position and is ready for carving. Slices may be cut lengthwise, downwardly, or obliquely in any direction, without hindrance, and since there are no external harnesses or braces, the meat may be carved to an extremely small butt end, the thinness of the slice being limited only by the comparatively short prongs 24.

Prongs 24 perform a double function: first, to prevent the meat from rotating when member 29 is being rotated; and second, to hold the meat together during the slicing operation, the latter being particularly important when carving cold meat down to the last slice. Also a sufficient number of prongs 24 are provided in a suitable array over board 21 so that meats and fowl of a variety of shapes and sizes can be accommodated. The pair of prongs 24a and 24b, in close proximity to screw member 29, are particularly effective in preventing the meat or fowl from being rotated as tines 31 engage and rotatably cut into the object to be carved.

Stability for the carving operation is provided by pressing down on board 21 to cause vacuum cups to adhere to serving platter 20, or to a table, or the like. When mounted on serving platter 20, the latter serves to catch gravy and other drippings that flow from the meat.

Because of the novel screw lock arrangement provided by member 29 and tines 31, prongs 24 need project only a short distance above the top surface of board 21 so that the meat may be sliced down to a very small butt end. In the case of cold meat which has become adherent to board 21, it may be preferable to cause the suction cups to be applied directly to a table top which can provide a greater stability for the carving operation.

When it is desired to remove the meat from board 21, handle 33 is returned to its original position as shown in Fig. 1, this action causing tines 31 to withdraw from the meat and to cause the latter to move away from the top surface of the board. This unlocking action is particularly useful in the case of meat that has been permitted to cool upon board 21, or which has been stored on the board in the refrigerator. The cold meat is usually strongly adherent to board 21 and prongs 24 by virtue of the congealing of the meat juices and extracts therebetween, which would normally prevent the easy removal of the meat from the board. In reversing the rotation of member 29 and tines 31 by the manipulation of handle 33 back to the original position shown in Fig. 1, the reversing tines will force the meat away from board 21 and from prongs 24, thereby facilitating the removal of the cold meat.

Although member 29 may be secured permanently and rotatably in position in board 21, it may also be desirable, in some embodiments to facilitate cleaning member 29, tines 31, as well as board 21, after use. For this purpose, the diameter of shaft 28 is arranged to be slightly less than aperture 27 so that member 29 and shaft 28 may be lifted from board 21 as a unit. Shaft 28 extends a short distance below the bottom surface 22 of the board and just short of its lower end there is provided an annular recess 35 adapted to accommodate the inner edges of a U-shaped recess 36 extending longitudinally from one end to substantially the mid portion of spring clip 37 (Figs. 3, 5 and 6). The other end of clip 37 has a perpendicularly extending flange 38 which serves as a grasping means for moving clip 37 into or out of position.

Clip 37 has two laterally extending ridges 39, the portion of the clip between said ridges forming a spring bridge 40. While the curved portions of ridges 39 bear against the bottom surface of board 21, spring bridge 40 bears against flange 41 of shaft 28 to urge the latter away from the bottom surface of board 21 (Fig. 5) so that member 29 is normally urged against the top surface 25 of the board, the pressure exerted being insufficient, however, to prevent member 29 from being freely rotated. After the meat has been removed from tines 31 by the unlocking screw action described hereinabove, flange 38 is grasped to pull clip 37 toward the outer edge of board 21, withdrawing the clip from engagement with recess 35 thereby releasing shaft 28, which, together with member 29, is readily removable from the board. After member 29, tines 31, shaft 28, board 21 and prongs 24 have been cleaned, shaft 28 is reinserted into aperture 27, and clip 37 returned into engagement with recess 35 of shaft 28 so that the carving board is ready to be used again.

It is understood that other equivalent means are contemplated for removably securing member 29 and its tines to board 21, said means being positioned either on the bottom of board 21 or on the top of the board in conjunction with or on member 29.

In some embodiments, handle 33 may be omitted from member 29, and instead, shaft 28 may be rotated by means of a lever, wing nut or the like, attached to the bottom of said shaft to perform the same function of rotating member 29, these alternative structures being considered the equivalents of handle 33.

In the specification, I have explained the principles of my invention, and the best mode in which I have contemplated applying those principles, so as to distinguish my invention from other inventions; and I have particularly pointed out and distinctly claimed the part, mode or combination which I claim as my invention or discovery.

While I have shown and described certain preferred embodiments of my invention, it will be understood that modifications and changes may be made without departing from the function and scope thereof, as will be clear to those skilled in the art.

I claim:

1. A device for holding meat or fowl for carving, comprising a board, a flat plate mounted rotatably and slidably adjacent the top surface of said board, a plurality of obliquely extending spaced apart tines on said plate, the points of said tines being arrayed in the same circular direction and acting as a screw when said plate is rotated, a plurality of spaced apart prongs positioned near said plate and extending substantially perpendicularly from the top surface of said board, the rotation of said plate causing the penetration of said tines into the object to be carved and causing the latter to be drawn toward said board surface and to be pierced also by said prongs, means on said plate and slidable on said board surface, said means being adapted to be manually grasped for rotating said plate, and stop means on said board, said first mentioned means being movable angularly between said stop means.

2. A device according to claim 1 wherein the penetrating lengths of said tines are substantially angularly equivalent to the angle of rotation of said first mentioned means between said second mentioned means.

3. A device for holding meat or fowl for carving, comprising a board, a flat plate mounted rotatably and slidably adjacent the top surface of said board, a plurality of obliquely extending spaced apart tines on said plate, the points of said tines being arrayed in the same circular direction and acting as a screw when said plate is rotated, an array of spaced apart perpendicular prongs on said board, at least a pair of said prongs being in close proximity to said plate, the rotation of said plate causing the penetration of said tines into the object to be carved and causing the latter to be drawn toward said board surface, said pair of prongs acting to prevent the rotation of said object as it is being engaged and cut into by said tines.

4. A device according to claim 3, and further comprising a vertical aperture in said board, a shaft rotatable freely within said aperture, the upper end of said shaft being connected to said plate, the lower end of said shaft extending below the bottom surface of said board, an annular notch at the lower end of said shaft, and a resilient clip slidably movable along the bottom surface of said board and adapted removably to engage said notch and to secure said plate to the upper surface of said board, said shaft being rotatable when engaged by said clip.

5. A device for holding meat or fowl for carving, comprising a board, a flat metallic plate mounted rotatably and slidably adjacent the top surface of said board, a plurality of obliquely extending spaced apart tines on said plate, the points of said tines being arrayed in the same circular direction and acting as a screw when said plate is rotated, an extension on said plate, said extension being slidable on said board surface and projecting over the edge of said board for manual rotation of said plate, and a plurality of spaced apart prongs positioned near said plate and extending substantially perpendicularly from the top surface of said board, at least a pair of said prongs being in close proximity to said plate, the rotation of said plate causing the penetration of said tines into the object to be carved and causing the latter to be drawn toward said board surface and to be pierced also by said prongs, said pair of prongs acting to prevent the rotation of said object to be carved as it is being engaged and cut into by said tines.

6. A device according to claim 5 wherein said extension is movable angularly between said pair of prongs, the space between said two prongs determining the limit of rotation of said plate.

7. A device according to claim 6 wherein the effective penetrating lengths of said tines are substantially angularly equivalent to the angle of rotation of said extension between said two limiting prongs.

References Cited in the file of this patent

UNITED STATES PATENTS

| | | |
|---|---|---|
| 524,645 | McAusland | Aug. 14, 1894 |
| 943,767 | Bullard | Dec. 21, 1909 |
| 1,223,879 | Hopkinson | Apr. 24, 1917 |
| 1,278,056 | Stukart | Sept. 3, 1918 |
| 1,451,776 | Jaquette | Apr. 17, 1923 |
| 1,471,122 | Greaves | Oct. 16, 1923 |
| 1,527,766 | Wellman et al. | Feb. 24, 1925 |
| 1,702,064 | Thomas | Feb. 12, 1929 |
| 2,033,039 | Limpert | Mar. 3, 1936 |
| 2,102,542 | Markle | Dec. 14, 1937 |